(12) United States Patent
Kim et al.

(10) Patent No.: US 12,049,228 B2
(45) Date of Patent: Jul. 30, 2024

(54) METHOD FOR GENERATING VEHICLE CONTROL SIGNAL BASED ON MAGNETIC PAINT LANE AND APPARATUS USING THE SAME

(71) Applicant: JEONGSEOK CHEMICAL CORPORATION, Jeollabuk-do (KR)

(72) Inventors: Yong-Hyun Kim, Jeollabuk-do (KR); Seok-Hee Im, Jeollabuk-do (KR); Dae-Won Kim, Jeollabuk-do (KR)

(73) Assignee: Jeongseok Chemical Corporation, Jeollabuk-do (KR)

( * ) Notice: Subject to any disclaimer, the term of this patent is extended or adjusted under 35 U.S.C. 154(b) by 0 days.

(21) Appl. No.: 17/894,086

(22) Filed: Aug. 23, 2022

(65) Prior Publication Data
US 2023/0079119 A1  Mar. 16, 2023

(30) Foreign Application Priority Data
Sep. 13, 2021  (KR) .................. 10-2021-0121531

(51) Int. Cl.
*B60W 40/105* (2012.01)
*G05D 1/00* (2024.01)

(52) U.S. Cl.
CPC ......... *B60W 40/105* (2013.01); *G05D 1/0259* (2013.01); *B60W 2420/50* (2013.01); *B60W 2552/53* (2020.02)

(58) Field of Classification Search
CPC .......... B60W 40/105; B60W 2420/50; B60W 2552/53; G05D 1/0259
USPC .......................................................... 701/70
See application file for complete search history.

(56) References Cited

U.S. PATENT DOCUMENTS

| | | | | | |
|---|---|---|---|---|---|
| 6,100,821 | A | * | 8/2000 | Tanji | G08G 1/01 340/988 |
| 10,909,716 | B2 | * | 2/2021 | Zhao | G01S 13/765 |
| 11,131,561 | B2 | * | 9/2021 | Yamamoto | G09B 29/106 |
| 11,143,731 | B2 | | 10/2021 | Yamamoto et al. | |
| 11,242,659 | B2 | * | 2/2022 | Yamamoto | E01F 9/30 |
| 11,280,053 | B2 | * | 3/2022 | Yamamoto | G08G 1/165 |
| 11,294,090 | B2 | * | 4/2022 | Yamamoto | G05D 1/0259 |

(Continued)

FOREIGN PATENT DOCUMENTS

| | | |
|---|---|---|
| EP | 3831680 A1 | 6/2021 |
| JP | 10-301625 A | 11/1998 |

(Continued)

OTHER PUBLICATIONS

English Translation of JP2001325697, Accessed Dec. 2023 (Year: 2023).*

(Continued)

*Primary Examiner* — Krishnan Ramesh
(74) *Attorney, Agent, or Firm* — IceMiller LLP

(57) ABSTRACT

Disclosed herein are a method for generating a vehicle control signal based on magnetic paint lanes and an apparatus for the same. The method includes generating a magnetic sensing signal corresponding to an alternating magnetic pattern from magnetic paint lanes, performing noise filtering on the magnetic sensing signal so as to generate a magnetic sensing signal from which noise is removed, and controlling the operation of a vehicle based on the magnetic sensing signal from which noise is removed.

12 Claims, 12 Drawing Sheets

(56) References Cited

U.S. PATENT DOCUMENTS

| | | | |
|---|---|---|---|
| 2013/0282222 A1* | 10/2013 | Ozaki | G05D 1/0259 |
| | | | 701/23 |
| 2018/0283904 A1* | 10/2018 | Yamamoto | G05D 1/02 |
| 2019/0018989 A1 | 1/2019 | Kovarik et al. | |
| 2019/0064842 A1* | 2/2019 | Dalfra | G05D 1/0265 |
| 2019/0098468 A1* | 3/2019 | Yamamoto | G01C 21/26 |
| 2020/0149862 A1* | 5/2020 | Luo | G01B 7/003 |
| 2021/0300381 A1* | 9/2021 | Hong | B60W 50/14 |
| 2021/0340715 A1* | 11/2021 | Yamamoto | G08G 1/042 |
| 2022/0306099 A1* | 9/2022 | Kleickmann | B60W 30/146 |

FOREIGN PATENT DOCUMENTS

| | | | |
|---|---|---|---|
| JP | 2001325697 A | * | 11/2001 |
| JP | 2019-184473 A | | 10/2019 |
| KR | 10-2015-0125115 A | | 11/2015 |
| KR | 10-2019-0115503 A | | 10/2019 |
| KR | 10-2020-0070867 A | | 6/2020 |
| KR | 10-2122747 B1 | | 6/2020 |
| WO | 2020/262221 A1 | | 12/2020 |

OTHER PUBLICATIONS

Search Report for EP Patent Application No. EP22193173.6, dated Feb. 7, 2023.

* cited by examiner

| VEHICLE SPEED | km/h | 25 | 30 | 50 | 60 | 70 | 80 | 100 | 120 |
|---|---|---|---|---|---|---|---|---|---|
| TRAVEL DISTANCE PER SECOND BASED ON SPEED | cm | 694 | 833 | 1,389 | 1,667 | 1,944 | 2,222 | 2,778 | 3,333 |
| TARGET FREQUENCY(HZ) | SPATIAL PERIOD | | | | | | | | |
| | 5cm | 138.9 | 166.7 | 277.8 | 333.3 | 388.9 | 444.4 | 555.6 | 666.7 |
| | 10cm | 69.4 | 83.3 | 138.9 | 166.7 | 194.4 | 222.2 | 277.8 | 333.3 |
| | 15cm | 46.3 | 55.6 | 92.6 | 111.1 | 129.6 | 148.1 | 185.2 | 222.2 |
| | 20cm | 34.7 | 41.7 | 69.4 | 83.3 | 97.2 | 111.1 | 138.9 | 166.7 |
| | 25cm | 27.8 | 33.3 | 55.6 | 66.7 | 77.8 | 88.9 | 111.1 | 133.3 |
| | 30cm | 23.1 | 27.8 | 46.3 | 55.6 | 64.8 | 74.1 | 92.5 | 111.1 |

FIG. 2

METHOD FOR GENERATING VEHICLE CONTROL SIGNAL BASED ON MAGNETIC PAINT LANE AND APPARATUS USING THE SAME

CROSS REFERENCE TO RELATED APPLICATION

This application claims the benefit of Korean Patent Application No. 10-2021-0121531, filed Sep. 13, 2021, which is hereby incorporated by reference in its entirety into this application.

BACKGROUND OF THE INVENTION

1. Technical Field

The present invention relates generally to technology for controlling a vehicle by detecting a signal generated from lanes marked using magnetic paint, and more particularly to technology for clearly detecting a signal for controlling operation of a vehicle by performing noise filtering on a magnetic sensing signal that is detected so as to correspond to an alternating magnetic pattern.

2. Description of the Related Art

Unless otherwise indicated herein, the content described in this section is not the prior art with regard to the claims in this application, and are not admitted to be prior art by inclusion in this section.

An autonomous driving system may apply magnetic information, detected in lanes marked using magnetic paint, to driving of an autonomous vehicle.

For example, lanes are marked on a road using magnetic paint including ferromagnetic particles, an alternating magnetic pattern is applied to the lanes using an alternating current (AC) magnetic field, and the alternating magnetic pattern is detected using a magnetic sensor provided in an autonomous vehicle, whereby information related to driving, such as the speed of a vehicle or lane information, is provided to a driver or passengers in the autonomous vehicle.

Here, the provided information related to driving of the vehicle may correspond to the frequency of the alternating magnetic pattern or the amplitude of the detected magnetic signal.

Meanwhile, vibration occurring while driving, outdoor power transmission lines, and the like may make it difficult for a vehicle to detect a magnetic signal generated from magnetic paint lanes to which an alternating magnetic pattern is applied, because they act as noise in the signal detected through the magnetic sensor of the vehicle.

DOCUMENTS OF RELATED ART (Patent Document 1) Korean Patent Application Publication No. 10-2015-0125115, published on Nov. 9, 2015 and titled "Method for generating driving path to which magnetic powder is applied and detection device using the same."

SUMMARY OF THE INVENTION

An object of the present invention is to clearly detect a magnetic signal generated from magnetic paint lanes to which an alternating magnetic pattern is applied, thereby safely controlling a vehicle.

Another object of the present invention is to reduce, in an autonomous vehicle system for driving an autonomous vehicle using a magnetic signal generated from magnetic paint lanes, malfunction of the autonomous vehicle by removing noise resulting from other vehicles, power transmission lines, vibration of the autonomous vehicle, and the like, thereby enabling safe operation of the autonomous vehicle.

A further object of the present invention is to change a cutoff frequency value in a frequency filter in real time in a manner adaptive to the speed of a vehicle, which frequently changes while driving, thereby improving a signal-to-noise ratio and the safety of an autonomous vehicle.

The objects of the present invention are not limited to the above objects, and it is apparent that other objects can be derived from the following description.

In order to accomplish the above objects, a method for generating a vehicle control signal based on magnetic paint lanes according to an embodiment of the present invention includes generating a magnetic sensing signal corresponding to an alternating magnetic pattern from magnetic paint lanes, performing noise filtering on the magnetic sensing signal so as to generate a magnetic sensing signal from which noise is removed, and controlling an operation of a vehicle based on the magnetic sensing signal from which noise is removed.

Here, the magnetic paint lanes may be generated so as to have a spatial period of a length greater than 0 cm and equal to or less than 25 cm by applying the alternating magnetic pattern.

Here, noise filtering may comprise filtering out a low-frequency signal having a frequency lower than a target frequency, detected by taking into consideration the spatial period of the alternating magnetic pattern and a speed of the vehicle.

Here, noise filtering may comprise filtering out a first noise frequency component, corresponding to the state in which the vehicle is not being driven, and a second noise frequency component, corresponding to the state in which a change in the driving speed of the vehicle is less than a preset reference level.

Here, noise filtering may comprise changing the properties of filtering so as to correspond to a target frequency detected based on the speed of the vehicle.

Here, the speed of the vehicle may be acquired based on information fed back from at least one of a speedometer in the vehicle, or a GPS sensor therein, or a combination thereof.

Here, noise filtering may comprise setting a passband, the center frequency of which is set to the target frequency, and filtering out a noise frequency component that is not included in the passband.

Here, the passband may be reset at a setting period set in consideration of the speed of the vehicle.

Here, the setting period may be calculated based on an emergency braking distance corresponding to the speed of the vehicle and on a travel distance corresponding to the speed of the vehicle for a preset time.

Here, noise filtering may comprise reducing the width of the passband when the difference in amplitude between a signal corresponding to the target frequency and a signal corresponding to the noise frequency component is less than a preset reference difference.

Here, the passband may correspond to a range from a low cutoff frequency to a high cutoff frequency, the low cutoff frequency and the high cutoff frequency being set so as to correspond to a signal, the amplitude of which is less than that of a signal of the center frequency by a preset reference amplitude.

Also, in order to accomplish the above objects, an apparatus for generating a vehicle control signal based on magnetic paint lanes according to an embodiment of the present invention includes a processor for generating a magnetic sensing signal corresponding to an alternating magnetic pattern from magnetic paint lanes, performing noise filtering on the magnetic sensing signal so as to generate a magnetic sensing signal from which noise is removed, and controlling an operation of a vehicle based on the magnetic sensing signal from which noise is removed; and memory for storing the magnetic sensing signal.

Here, the magnetic paint lanes may be generated so as to have a spatial period of a length greater than 0 cm and equal to or less than 25 cm by applying the alternating magnetic pattern.

Here, noise filtering may comprise filtering out a low-frequency signal having a frequency lower than a target frequency, detected by taking into consideration the spatial period of the alternating magnetic pattern and a speed of the vehicle.

Here, noise filtering may comprise filtering out a first noise frequency component, corresponding to the state in which the vehicle is not being driven, and a second noise frequency component, corresponding to the state in which a change in the driving speed of the vehicle is less than a preset reference level.

Here, noise filtering may comprise changing the properties of filtering so as to correspond to a target frequency detected based on the speed of the vehicle.

Here, the speed of the vehicle may be acquired based on information fed back from at least one of a speedometer in the vehicle, or a GPS sensor therein, or a combination thereof.

Here, noise filtering may comprise setting a passband, the center frequency of which is set to the target frequency, and filtering out a noise frequency component that is not included in the passband.

Here, the passband may be reset at a setting period set in consideration of the speed of the vehicle.

Here, the setting period may be calculated based on an emergency braking distance corresponding to the speed of the vehicle and on a travel distance corresponding to the speed of the vehicle for a preset time.

Here, noise filtering may comprise reducing the width of the passband when the difference in amplitude between a signal corresponding to the target frequency and a signal corresponding to the noise frequency component is less than a preset reference difference.

Here, the passband may correspond to a range from a low cutoff frequency to a high cutoff frequency, the low cutoff frequency and the high cutoff frequency being set so as to correspond to a signal, the amplitude of which is less than that of a signal of the center frequency by a preset reference amplitude.

BRIEF DESCRIPTION OF THE DRAWINGS

The above and other objects, features, and advantages of the present invention will be more clearly understood from the following detailed description taken in conjunction with the accompanying drawings, in which:

FIG. 2 is a view illustrating an example of a target frequency detected in consideration of the speed of a vehicle and a spatial period in magnetic paint lanes according to the present invention;

DESCRIPTION OF THE PREFERRED EMBODIMENTS

Figure 1:
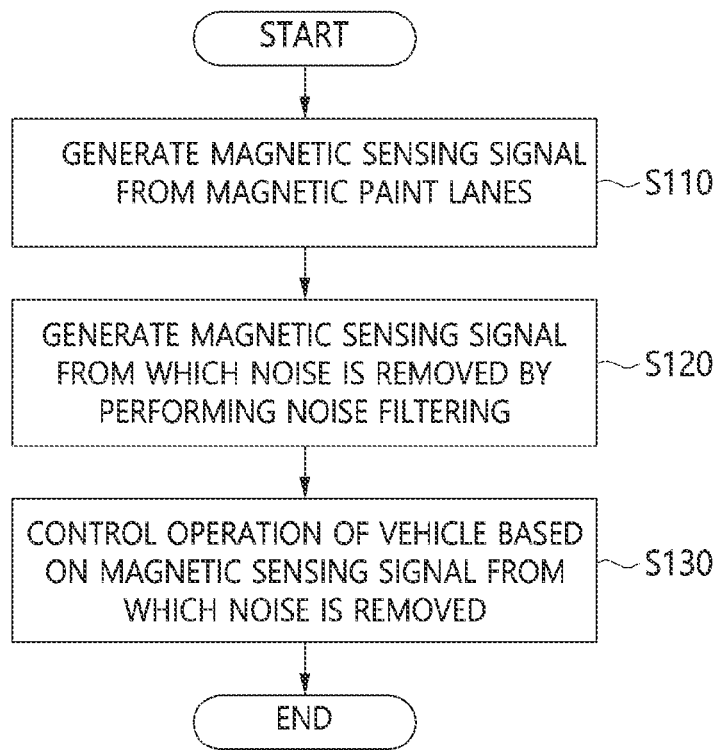
FIG. 1 is a flowchart illustrating a method for generating a vehicle control signal based on magnetic paint lanes according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

An autonomous vehicle that performs autonomous driving by detecting a magnetic signal generated from magnetic paint lanes to which an alternating magnetic pattern is applied has the possibility of malfunctioning because accurate signal detection is impeded by noise occurring in the vicinity thereof. For example, vehicles in the vicinity of an autonomous vehicle, power noise generated from power transmission lines (60 Hz in South Korea), or noise of vibration of the autonomous vehicle itself due to an uneven road surface may correspond to such noise.

In order to solve this problem, various frequency filters for improving a signal-to-noise ratio may be used for a magnetic sensor provided in a vehicle. Among such frequency filters, a frequency filter using a physical filter formed of RLC components (a resistor, an inductor, and a capacitor) performs filtering so as to correspond to a cutoff frequency, which is set to a fixed value at the time of manufacturing the filter. Here, in order to change the cutoff frequency value, it is required to replace the passive RLC elements in the module of the frequency filter.

However, because the target frequency that has to be detected by an autonomous driving system using an alternating magnetic pattern changes frequently depending on the frequently changing speed of a vehicle, such a frequency filter using a fixed cutoff frequency is not sufficient to smoothly perform noise filtering, and may cause malfunction of the autonomous vehicle.

Also, in the case of a sensor module manufactured for detecting a signal in a vehicle, a cutoff frequency or bandwidth is set to have a wide range in order to use the sensor module for general purposes or due to difficulty in the production of the sensor module. Accordingly, it is difficult to improve a signal-to-noise ratio.

In order to solve the above problems, the present invention intends to propose a method for effectively filtering out a noise component unrelated to driving depending on the speed of a vehicle and clearly detecting a signal of an alternating magnetic pattern based on magnetic paint lanes through filtering, thereby enabling safe operation of the vehicle.

FIG. 1 is a flowchart illustrating a method for generating a vehicle control signal based on magnetic paint lanes according to an embodiment of the present invention.

Referring to FIG. 1, in the method for generating a vehicle control signal based on magnetic paint lanes according to an embodiment of the present invention, a magnetic sensing signal corresponding to an alternating magnetic pattern is generated from magnetic paint lanes at step S110.

Here, the magnetic sensing signal may be acquired using a magnetic sensor provided in a vehicle.

Here, the magnetic paint lanes may be generated so as to have a constant spatial period by applying an alternating magnetic pattern. The spatial period of the magnetic paint lanes may affect a magnetic sensing signal that is acquired while an autonomous vehicle is driving.

For example, referring to FIG. 2, a travel distance S (in units of cm) per second is calculated depending on the speed v of a vehicle, and the travel distance per second is divided by the spatial period (in units of cm) of the magnetic paint lanes, whereby the number of times an alternating magnetic pattern is detected while the vehicle is driving for one second may be calculated. Here, the calculated number of times the alternating magnetic pattern is detected may correspond to the target frequency $f_v$ that has to be detected by the vehicle. The process of calculating the target frequency $f_v$ in FIG. 2 may be represented as shown in Equation (1) below:

$$f_v = \frac{s}{\text{spatial period}} = v \times \frac{1}{3.6} \times \frac{100}{\text{spatial period}} \quad (1)$$

That is, the target frequency that has to be detected by the vehicle is changed depending on the spatial period of the magnetic paint lanes, which may greatly affect control of the driving vehicle.

Accordingly, in order to clearly isolate a signal required for controlling driving of a vehicle from a magnetic sensing signal, it is necessary to set the spatial period of the magnetic paint lanes such that the required signal is differentiated from noise.

Here, power noise resulting from nearby vehicles or power transmission lines (60 Hz in South Korea) may be considered noise, along with noise resulting from vibration of the vehicle itself or an uneven road surface.

Generally, vehicle vibration noise generated due to vibration of a vehicle itself or an uneven road surface is measured as about 30 Hz or lower than that. Also, noise may be generated due to nearby vehicles while driving, but considering the maximum speed limit and the minimum speed limit on a road, the relative speed between vehicles generally does not exceed 50 km/h. Also, in South Korea, power noise of 60 Hz is commonly detected, and this may be a consistent value that is detected regardless of the speed of the vehicle. Harmonics (frequencies having an integer multiple of a fundamental wave) of these kinds of noise also act as noise, but the amplitude of the harmonics is not large, compared to the amplitude of the fundamental wave.

Figure 3:
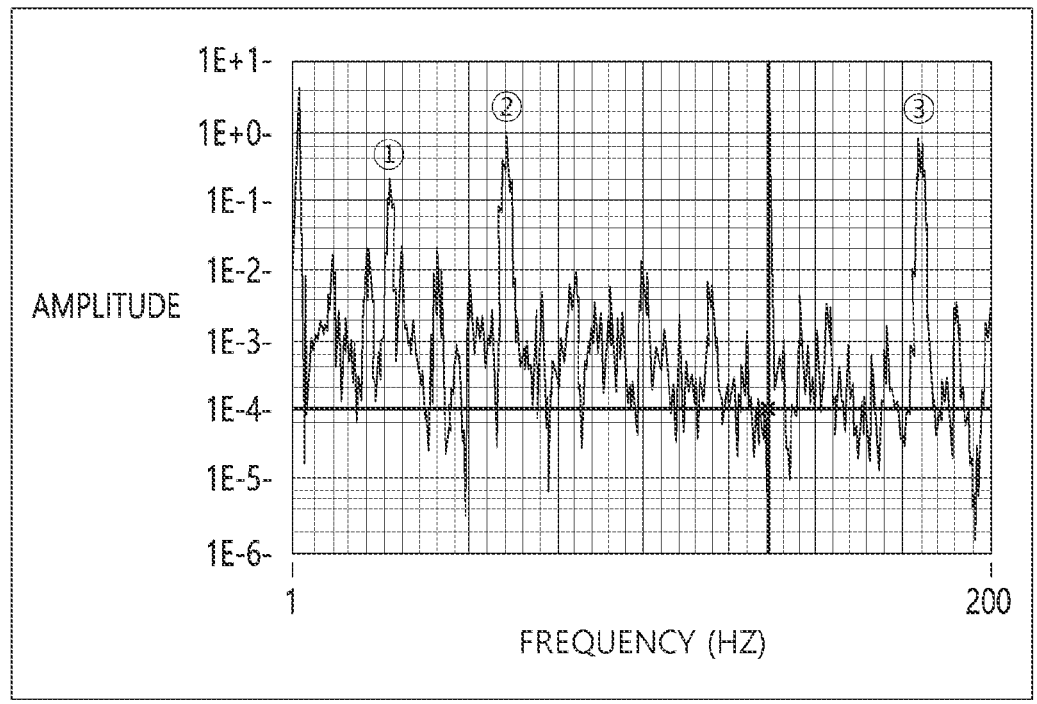
FIG. 3 is a view illustrating an example of a frequency component detected when a vehicle is started but is not driving on a general road.

For example, FIG. 3 illustrates the result of analysis of a frequency detected when a vehicle is started but is not driving on a general road, and referring to FIG. 3, it can be seen that the vibration frequency of the vehicle is clearly detected at about 26 Hz (①) and that 50 Hz, corresponding to a harmonic thereof, is also detected. Also, it can be seen that a frequency of about 60 Hz (②), corresponding to AC power noise, is detected, along with 180 Hz (③), corresponding to a harmonic thereof.

That is, considering power noise corresponding to 60 Hz, which is generated near a road, and vehicle vibration noise equal to or lower than 30 Hz, it is necessary to set the spatial period of magnetic paint lanes such that a signal of an alternating magnetic pattern can be clearly differentiated from these frequencies.

Figure 4:
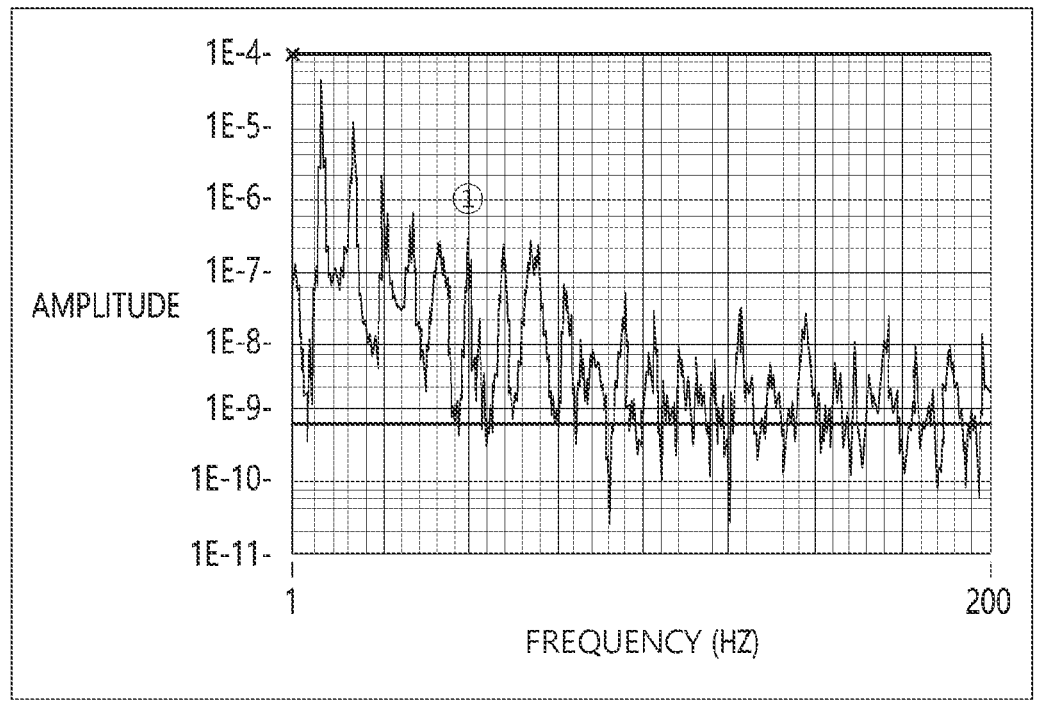
FIG. 4 is a view illustrating an example of a frequency component detected while a vehicle is driving at a speed of 50 km/h when an alternating magnetic pattern is applied such that magnetic paint lanes have a spatial period of 30 cm according to the present invention.

Here, FIG. 4 illustrates a frequency component detected while a vehicle is driving at a speed of 50 km/h when an alternating magnetic pattern is applied such that magnetic paint lanes have a spatial period of 30 cm, in which case a target frequency is expected to appear at about 47 Hz according to the table illustrated in FIG. 2.

The target frequency actually measured while driving is about 50 Hz (①), as shown in FIG. 4, and it may be determined that this is because the speed of the vehicle is not constant but changes in the range from 50 to 52 km/h while driving. Meanwhile, it can be seen that noise generated from vibration of the vehicle is also detected at a frequency of 60~70 Hz or lower, along with harmonics thereof. Therefore, it is not certain whether a frequency of 47~50 Hz intended to be detected is a frequency affected by vibration of the vehicle and harmonics thereof or a frequency due to the alternating magnetic pattern of the magnetic paint lanes.

Also, because various kinds of noise other than a frequency of 50 Hz are included in the detected frequency component, this may cause a severe malfunction when driving an autonomous vehicle.

The frequency of noise generated due to various reasons, as described above, does not change greatly even when a vehicle accelerates or decelerates, but the target frequency corresponding to the alternating magnetic pattern changes in proportion to the speed of the vehicle, as illustrated in FIG. 2.

For example, when the frequency component detected in the state in which a vehicle stops is compared with the frequency component detected when the vehicle is driving at a speed of 50 km/h with reference to FIG. 3 and FIG. 4, it can be seen that, in the case of actually detected noise, only the amplitude thereof, is changed but the frequency value thereof is not greatly changed.

That is, it can be seen that a frequency attributable to vibration of a vehicle illustrated as being detected at about 26 Hz (①) in FIG. 3 is illustrated as still being detected at about 26 Hz in FIG. 4 and that a frequency attributable to power noise illustrated as being detected at about 60 Hz (②) in FIG. 3 is illustrated as still being detected at about 60 Hz in FIG. 4.

Accordingly, the present invention intends to propose a method for removing noise components that are not greatly changed in a low-frequency band using the spatial period of magnetic paint lanes.

Also, in the method for generating a vehicle control signal based on magnetic paint lanes according to an embodiment of the present invention, noise filtering is performed on the magnetic sensing signal, whereby a magnetic sensing signal from which noise is removed is generated at step S120.

Here, the magnetic paint lanes may be generated so as to have a spatial period corresponding to a length greater than 0 cm and equal to or less than 25 cm by applying an alternating magnetic pattern.

Here, noise filtering may comprise filtering out a low-frequency signal having a frequency lower than a target frequency, detected by taking into consideration the spatial period of the alternating magnetic pattern and a speed of the vehicle.

Here, noise filtering may comprise filtering out a first noise frequency component, corresponding to the state in which a vehicle is not being driven, and a second noise frequency component, corresponding to the state in which a change in the driving speed of a vehicle is less than a preset reference level.

For example, referring to FIG. 2, it can be seen that, when an alternating magnetic pattern is applied such that magnetic paint lanes have a spatial period of 30 cm, the target frequency is 46.3 Hz at a speed of 50 km/h, 55.6 Hz at a speed of 60 km/h, and 64.8 Hz at a speed of 70 km/h. These target frequencies have a small difference when compared with the frequency of noise described above, so it is difficult to clearly isolate the target frequency.

Figure 5:
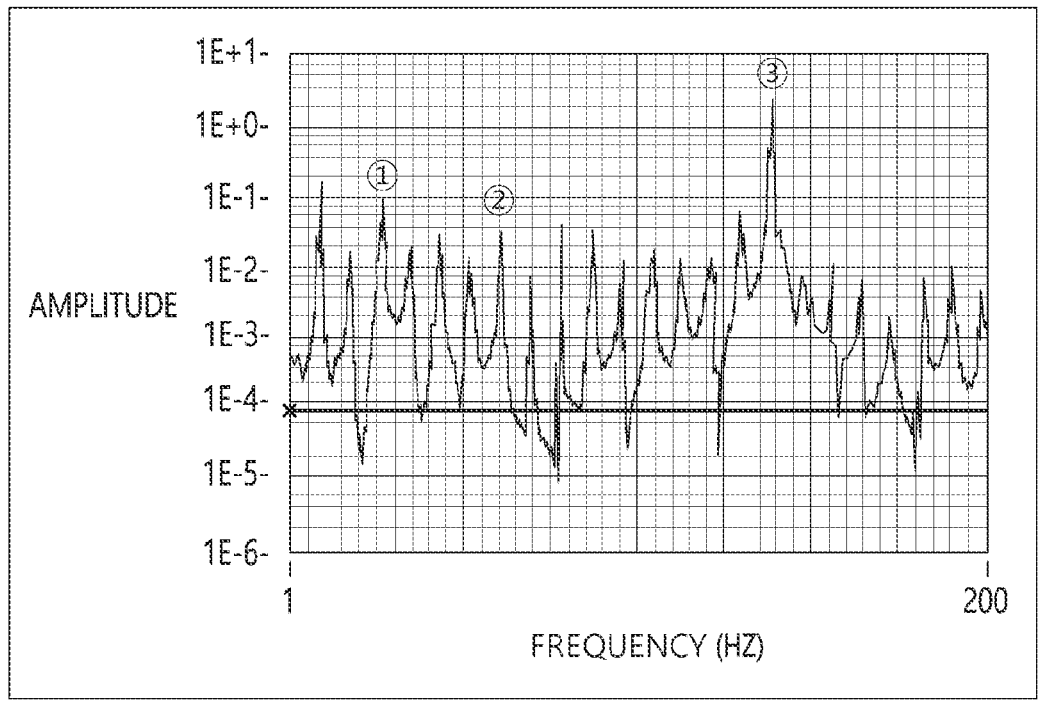
FIG. 5 is a view illustrating an example of a frequency component detected while a vehicle is driving at a speed of 50 km/h when an alternating magnetic pattern is applied such that magnetic paint lanes have a spatial period of 10 cm according to the present invention.

If an alternating magnetic pattern is applied such that magnetic paint lanes have a spatial period of 10 cm by reducing the spatial period to ⅓ of the original spatial period, when a vehicle is driving at a speed of 50 km/h, the target frequency may be detected at about 140 Hz (③), as illustrated in FIG. 5. Here, referring to FIG. 5, it can be seen that, although a frequency (①) attributable to vibration noise and a frequency (②) attributable to power noise appear, the target frequency is clearly differentiated therefrom and detected.

That is, when various noise components are taken into consideration, the target frequency may be desirably set to be equal to or greater than 60 Hz.

Also, considering the fact that most fatal traffic accidents occur when a vehicle is driving at high speeds, clearly detecting the target frequency at a speed equal to or higher than 60 km/h may be very important in order to secure safety when the vehicle is driving. Accordingly, the spatial period of magnetic paint lanes is set such that the target frequency becomes 60 Hz or higher at a speed equal to or higher than 60 km/h, and an alternating magnetic pattern may be applied based thereon.

Hereinafter, the process of filtering out a first noise frequency component and a second noise frequency component will be described in detail with reference to FIGS. 6 to 9.

Figure 6:
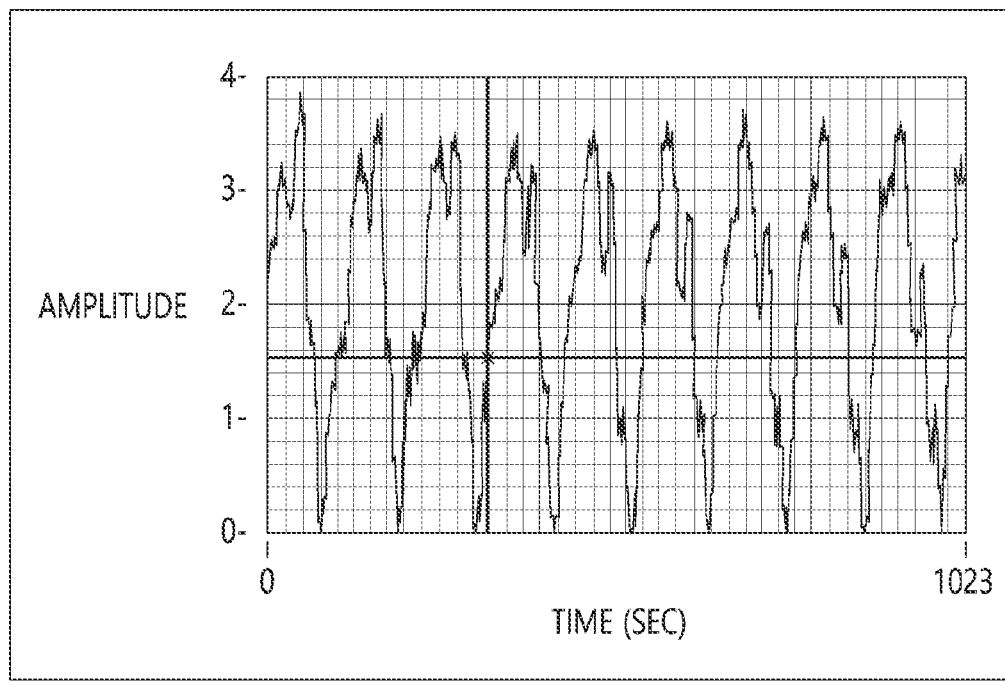
FIGS. 6 to 9 are views illustrating an example of a process of filtering out a first noise frequency component and a second noise frequency component according to the present invention.

First, FIG. 6 is a view illustrating the frequency component of a magnetic sensing signal detected while a vehicle is driving at a speed of 50 km/h when an alternating magnetic pattern is applied such that magnetic paint lanes have a spatial period of 10 cm. Referring to FIG. 6, it can be seen that other frequency components are almost hidden because a very strong signal corresponding to 10 Hz appears.

Figure 7:
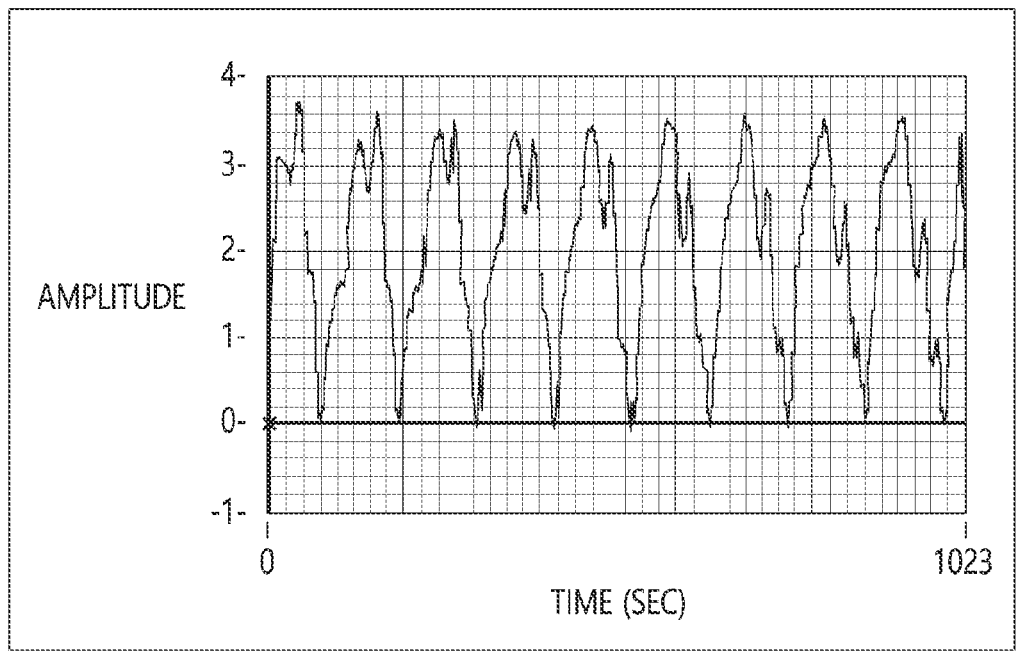

In order to remove noise in this state, a magnetic signal is filtered with a low-pass filter (LPF), which passes only a signal having a frequency equal to or lower than 80 Hz, whereby a filtered signal like what is illustrated in FIG. 7 may be generated.

Figure 8:
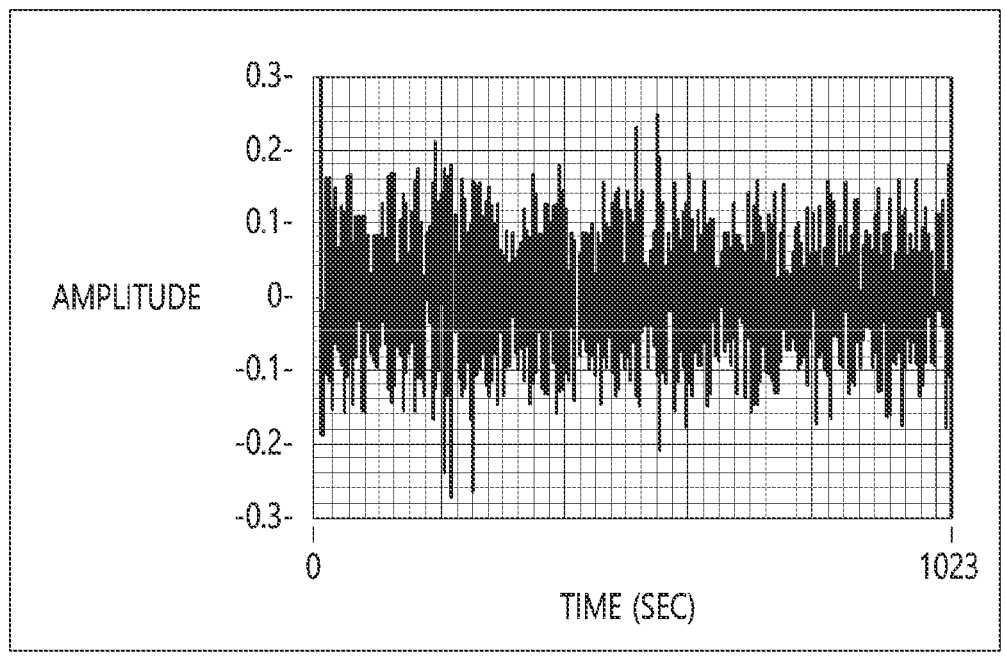

Then, the filtered signal illustrated in FIG. 7 is subtracted from the magnetic sensing signal illustrated in FIG. 6, whereby the signal from which the low-frequency signal is removed may be acquired, as shown in FIG. 8. Here, the signal illustrated in FIG. 8 still includes a frequency component attributable to vibration noise or power noise, but the signal amplitude of the corresponding frequency component is reduced through filtering according to the present invention.

Figure 9:
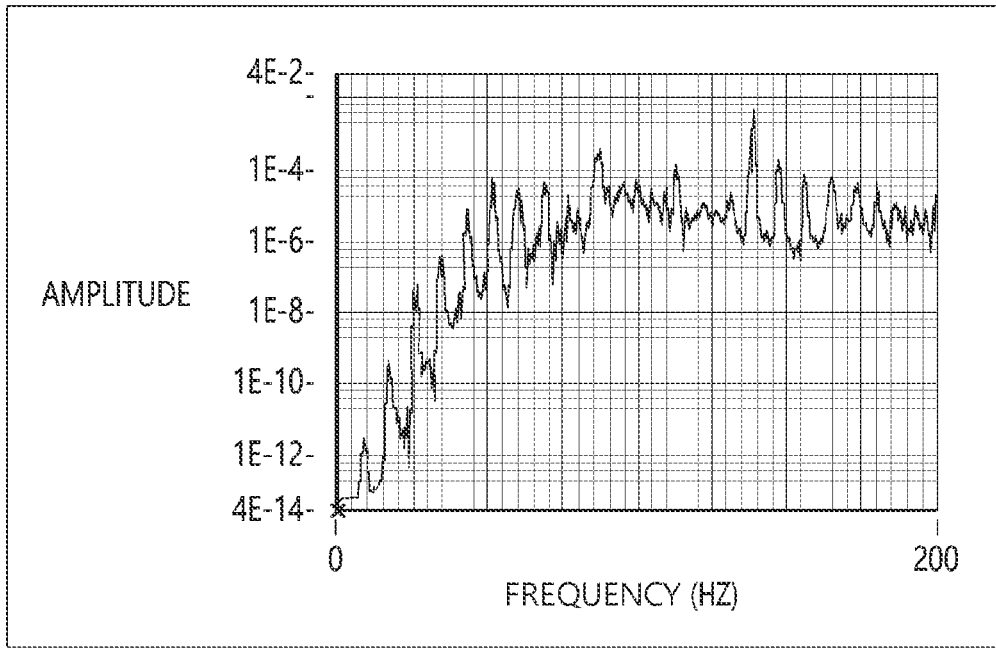

When the signal of FIG. 8, which is filtered as described above, is frequency-converted, the result shown in FIG. 9 may be acquired.

That is, when FIG. 5 illustrating the frequency component before noise filtering is compared with FIG. 9 illustrating the frequency component after noise filtering, it can be seen that the target frequency (about 138 Hz) is more clearly observed in FIG. 9 than in FIG. 5.

A signal in a low-frequency band is removed from a magnetic sensing signal using the above-described method, whereby noise signals in a low-frequency band, such as vibration noise or power noise, may be easily removed.

Here, noise filtering may comprise changing the properties of filtering so as to correspond to the target frequency, which is detected based on the speed of a vehicle.

Here, noise filtering may comprise setting a passband, the center frequency of which is set to the target frequency, and filtering out a noise frequency component that is not included in the passband.

For example, FIG. 5 illustrates the frequency component detected while a vehicle is driving at a speed of 50 km/h when an alternating magnetic pattern is applied such that magnetic paint lanes have a spatial period of 10 cm, and illustrates the state in which no particular noise filtering is performed. Here, in consideration of the content illustrated in FIG. 2, it is determined that the frequency corresponding to ③, among the frequencies illustrated in FIG. 5, is the target frequency and that the frequencies corresponding to ① and ② are noise frequencies. Also, it can be seen that the amplitude of the signal corresponding to the target frequency is about 10 times the amplitude of the signal corresponding to the noise frequency.

In this case, because most noise has a frequency of 60 Hz or lower, when a high-pass filter, which passes only a signal having a frequency equal to or higher than 60 Hz, is used, a signal corresponding to the target frequency (about 142 Hz) intended to be measured may be clearly detected.

Figure 10:
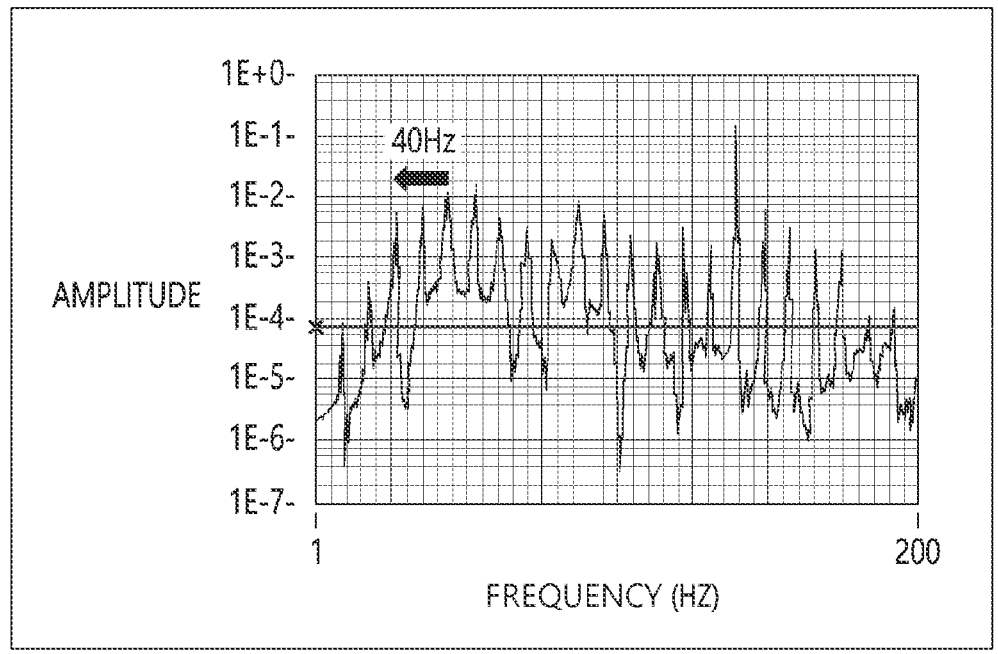
FIGS. 10 to 11 are views illustrating an example of a result of filtering the frequency component illustrated in FIG. 5 so as to correspond to a fixed cutoff frequency (40 Hz or 80 Hz)
Figure 11:
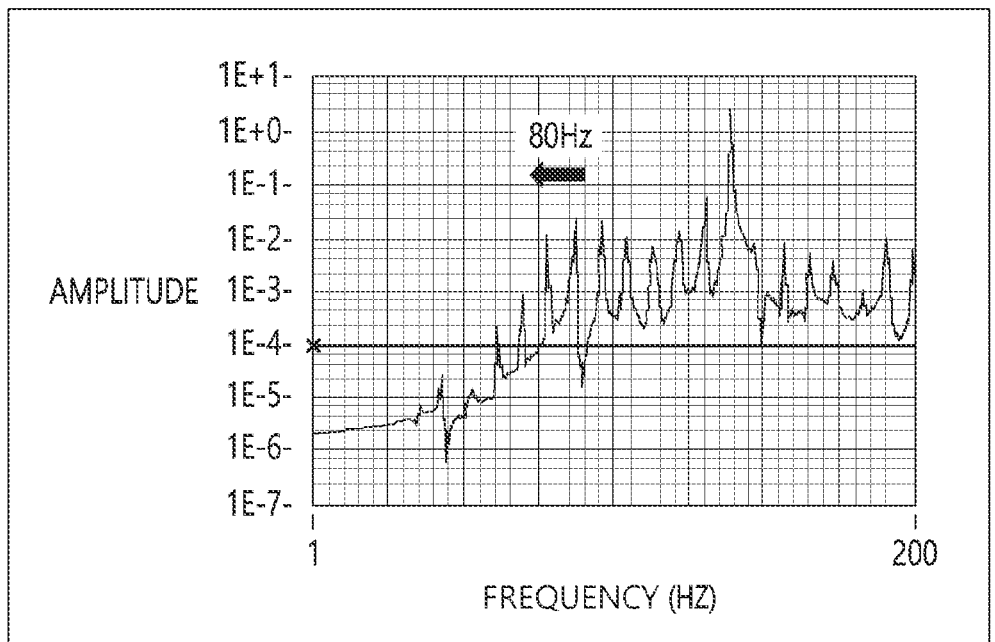

For example, FIGS. 10 to 11 illustrate a frequency analysis result when filtering is performed on the signal illustrated in FIG. 5 using a high-pass filter, which uses the fixed cutoff frequency of a physical passive element.

First, FIG. 10 illustrates the result of filtering the signal illustrated in FIG. 5 using a high-pass filter in which a cutoff frequency is set to 40 Hz. Here, when the frequency component of FIG. 5 is compared with the frequency component of FIG. 10, it can be seen that the frequency components equal to or lower than 40 Hz are merely attenuated, and there is no effect on the signal corresponding to the target frequency (about 142 Hz) intended to be actually detected.

In contrast, FIG. 11 illustrates the result of filtering the signal illustrated in FIG. 5 using a high-pass filter in which a cutoff frequency is set to 80 Hz, and it can be seen that the amplitude of the signal corresponding to the target frequency (about 142 Hz) is increased so as to be about 100 times greater than the amplitude of the signal corresponding to the noise frequency.

That is, when the frequency component of FIG. 10 is compared with that of FIG. 11, the signal corresponding to the target frequency may be more clearly identified using a high-pass filter in which an appropriate cutoff frequency is set, which may helpful for control of a vehicle such that the vehicle is safely driven.

However, a high-pass filter formed of a passive element using an RLC circuit necessarily has a fixed cutoff frequency. That is, there is no way to change the cutoff frequency without directly replacing the passive element, and because replacing the passive element requires operation on an electronic substrate within a module, it is difficult in practice to change the cutoff frequency.

However, because the target frequency increases in proportion to the speed of a vehicle, it is necessary to change the cutoff frequency of a high-pass filter in real time adaptively to the speed of the vehicle in order to maintain a high signal-to-noise ratio even while the vehicle is driving.

If a cutoff frequency that is fixed, as in the high-pass filter used in FIG. 10 and FIG. 11, cannot be changed, noise filtering may not be appropriately performed when a vehicle is accelerated or decelerated while driving, and thus it may be difficult to clearly detect a signal corresponding to a target frequency.

Accordingly, the present invention provides a noise-filtering method capable of maintaining a high signal-to-noise ratio regardless of the speed of a vehicle by changing a passband in real time in response to the speed of the vehicle, thereby providing an effect of greatly improving the safety of an autonomous vehicle.

Here, the speed of a vehicle may be acquired based on information that is fed back from at least one of a speedometer in the vehicle, or a GPS sensor therein, or a combination thereof.

For example, the speed of the vehicle, corresponding to the value output from the speedometer of the vehicle, may be acquired.

In another example, the travel distance of the vehicle is calculated using the location of the vehicle acquired through the GPS sensor, and the speed of the vehicle may be calculated based on the time and the travel distance.

Here, the passband may correspond to a range from a low cutoff frequency to a high cutoff frequency, the low cutoff frequency and the high cutoff frequency being set so as to correspond to a signal, the amplitude of which is less than that of a signal of the center frequency by a preset reference amplitude.

For example, referring to FIG. 15, frequencies at which the amplitude of a signal is 3 dB below the amplitude at the center frequency $f_0$ may be set as a low cutoff frequency $f_L$ and a high cutoff frequency $F_H$. Here, the width of the passband, that is, the frequency bandwidth B, may correspond to the value acquired by subtracting the low cutoff frequency from the high cutoff frequency.

Here, the passband may be set again at a setting period, which is set in consideration of the speed of the vehicle.

Figure 15:
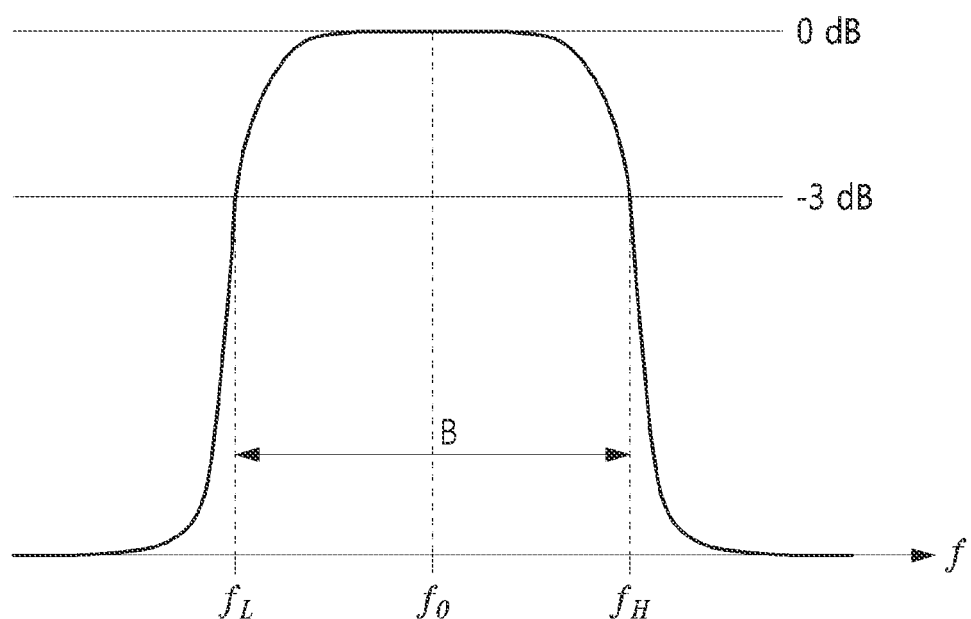
FIG. 15 is a view illustrating an example of a passband according to the present invention.

For example, because a target frequency $f_v$ is changed when the speed of a vehicle changes, it is necessary to again set the changed target frequency $f_v$ as the center frequency $f_0$ illustrated in FIG. 15. Here, when the center frequency $f_0$ is changed, the low cutoff frequency $f_L$ and the high cutoff frequency $F_H$ are set again, whereby the passband may also be changed.

Here, the process of setting the passband depending on the speed of the vehicle will be described in detail later with reference to FIG. 16.

Meanwhile, in order to respond to the frequently changing speed of a vehicle, it may be desirable to reset a passband at a period of five times per second (every 0.2 seconds) or more than five times per second. However, resetting the passband too frequently may impose restrictions on the specifications of an ADC in a module and the design of a CPU for calculation of a frequency and communication, which may increase the cost of manufacturing the module. Therefore, appropriately setting the period at which a passband is reset is an important point of the present invention.

Here, the period may be calculated based on an emergency braking distance corresponding to the speed of a vehicle and on the travel distance corresponding to the speed of the vehicle during a preset time.

For example, the distance traveled by a vehicle during the period at which the passband is reset is an important element for preventing an accident, so the period at which the passband is reset may be set in consideration of an actual situation, such as an emergency braking distance.

Here, the process of setting the period at which the passband is reset will be described in detail later with reference to FIG. 17.

Here, noise filtering may comprise reducing the width of the passband when the difference in amplitude between a signal corresponding to the target frequency and a signal corresponding to a noise frequency component is less than a preset reference difference.

For example, referring to FIG. 2, it can be seen that, when an alternating magnetic pattern is applied such that magnetic paint lanes have a spatial period of 10 cm and when a vehicle is driving at a speed of 30 km/h, a target frequency is 83 Hz.

Figure 12:
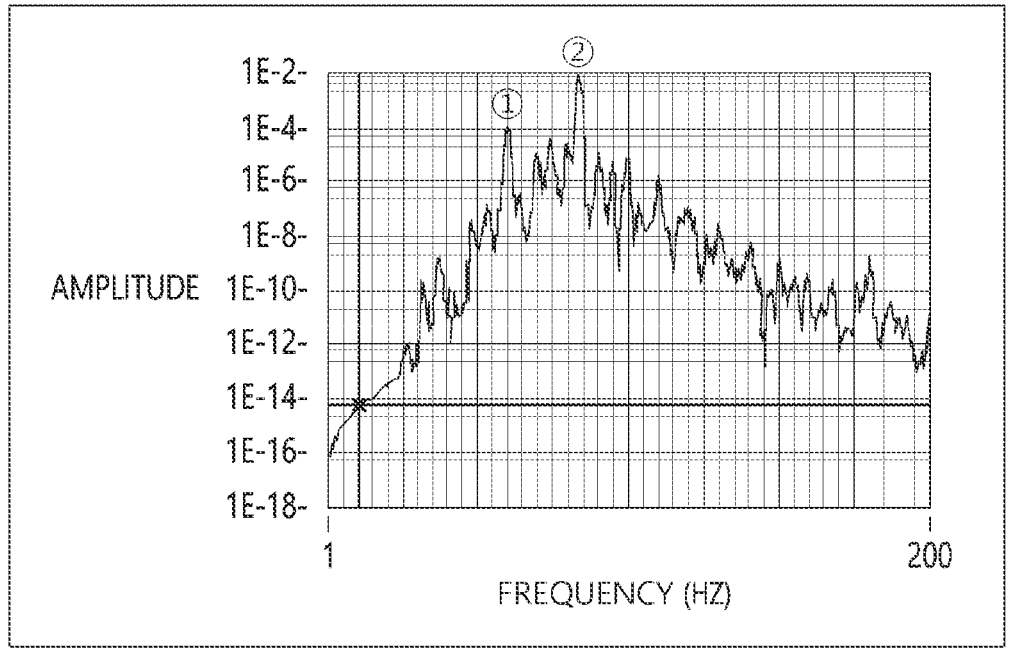
FIG. 12 is a view illustrating an example of a result of filtering a frequency component, detected while a vehicle is driving at a speed of 30 km/h when an alternating magnetic pattern is applied such that magnetic paint lanes have a spatial period of 10 cm, with a passband having a range of 71~101 Hz according to the present invention.

In this case, when noise filtering is performed using a passband of 71~101 Hz, a signal corresponding to the target frequency of 83 Hz (②) is detected, and the amplitude thereof is about 100 times that of a power noise signal corresponding to a frequency of 60 Hz (①), as shown in FIG. 12.

Figure 13:
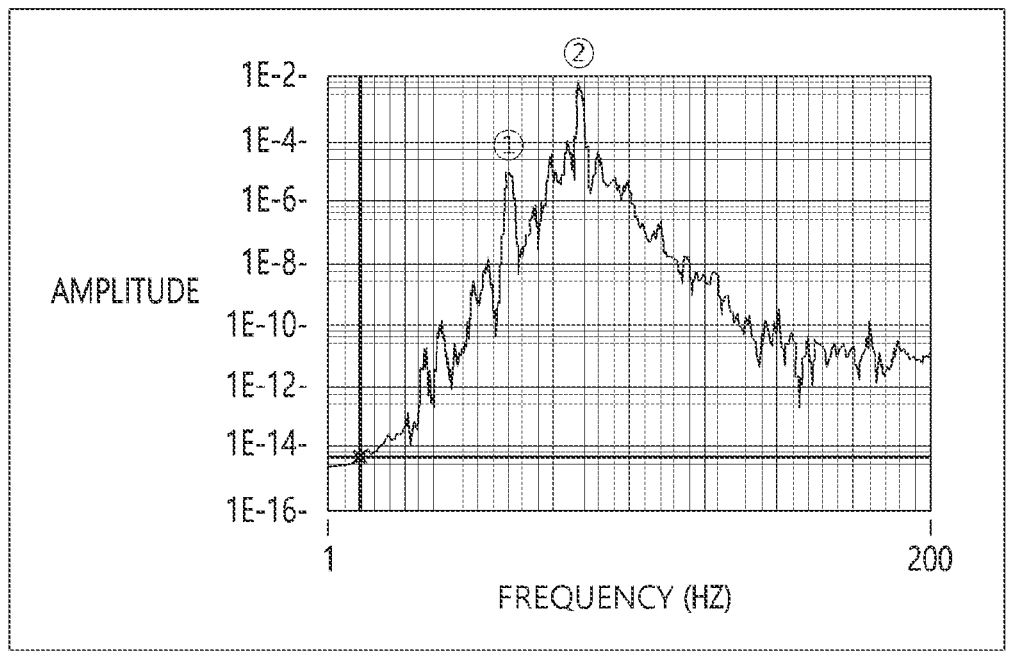
FIG. 13 is a view illustrating an example of a result of filtering the frequency component detected under the same conditions as in FIG. 12 with a passband having a range of 76~96 Hz.

However, if the passband is set to 76~96 Hz so as to be narrower than that, the amplitude of the signal corresponding to the target frequency of 83 Hz (②) has a difference of about 1000 times the amplitude of the power noise signal corresponding to a frequency of 60 Hz (①), as shown in FIG. 13.

That is, the signal corresponding to the alternating magnetic signal may be more clearly identified after noise filtering by setting a passband more precisely.

In another example, a description comparing FIG. 11 with FIG. 14 will be made in order to compare the result of performing noise filtering using a general high-pass filter with the result of performing noise filtering by precisely setting a passband according to the present invention.

First, FIG. 11 illustrates a result of filtering a signal, which is detected while a vehicle is driving at a speed of 50 km/h when an alternating magnetic pattern is applied such that magnetic paint lanes have a spatial period of 10 cm, with a high-pass filter in which a cutoff frequency is set to 80 Hz.

Figure 14:
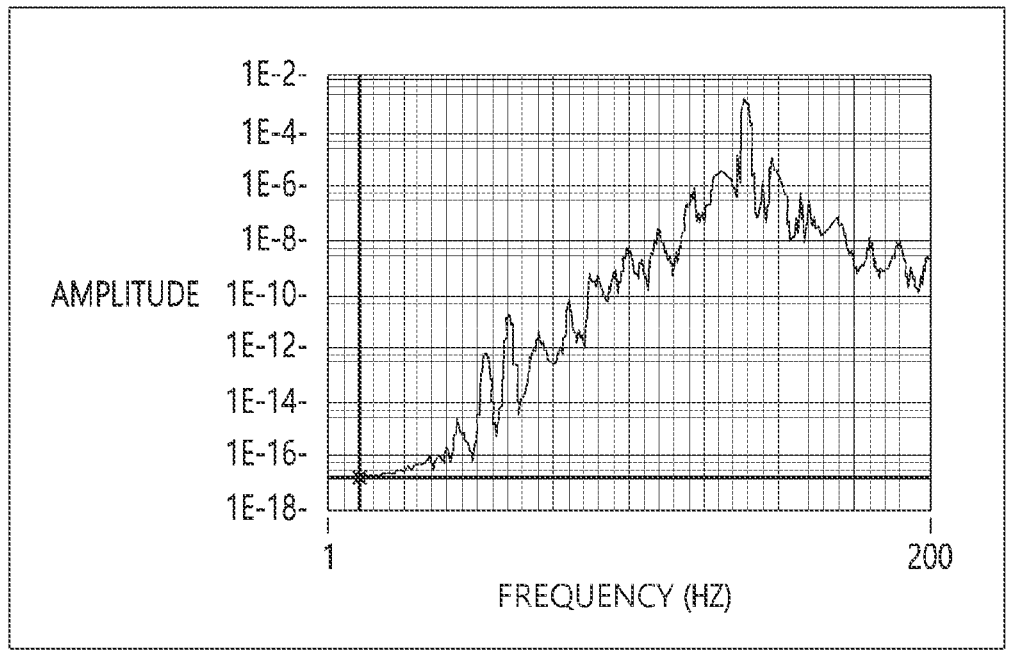
FIG. 14 is a view illustrating an example of a result of filtering after resetting a passband to 132~153 Hz when the speed of the vehicle is increased to 50 km/h in the situation of FIG. 12.

Also, FIG. 14 illustrates a result of filtering a signal, which is detected while a vehicle is driving at a speed of 50 km/h when an alternating magnetic pattern is applied such that magnetic paint lanes have a spatial period of 10 cm, with a passband of 132~153 Hz.

That is, under the same conditions, a signal corresponding to a target frequency is more clearly detected when noise filtering is performed with a passband that is more precisely set according to the present invention than when noise filtering is performed using a general high-pass filter.

Accordingly, in the present invention, when it is determined that a signal corresponding to a target frequency is not clearly identified, the bandwidth of a passband is set narrower based on the center frequency thereof, whereby the signal corresponding to the target frequency may be more clearly detected.

Also, in the method for generating a vehicle control signal based on magnetic paint lanes according to an embodiment of the present invention, operation of the vehicle is controlled based on the magnetic sensing signal from which noise is removed at step S130.

For example, the magnetic sensing signal from which noise is removed is frequency-converted, whereby a frequency-converted signal is generated. Then, operation of the vehicle may be controlled using the generated frequency-converted signal. Here, the frequency-converted signal may be used as information for driving an autonomous vehicle.

Through the above-described method for generating a vehicle control signal based on magnetic paint lanes, a magnetic signal generated from magnetic paint lanes to which an alternating magnetic pattern is applied is clearly detected, whereby operation of a vehicle may be safely controlled.

Also, for an autonomous vehicle system for driving an autonomous vehicle using a magnetic signal generated from magnetic paint lanes, noise from other vehicles, power transmission lines, vibration of the autonomous vehicle, and the like is removed, whereby the incidence of malfunction of the autonomous vehicle may be reduced and safe operation thereof may be realized.

Also, a cutoff frequency value in a frequency filter is changed in real time adaptively to the speed of a vehicle, which frequently changes while driving, whereby a signal-to-noise ratio and the safety of the autonomous vehicle may be improved.

Figure 16:
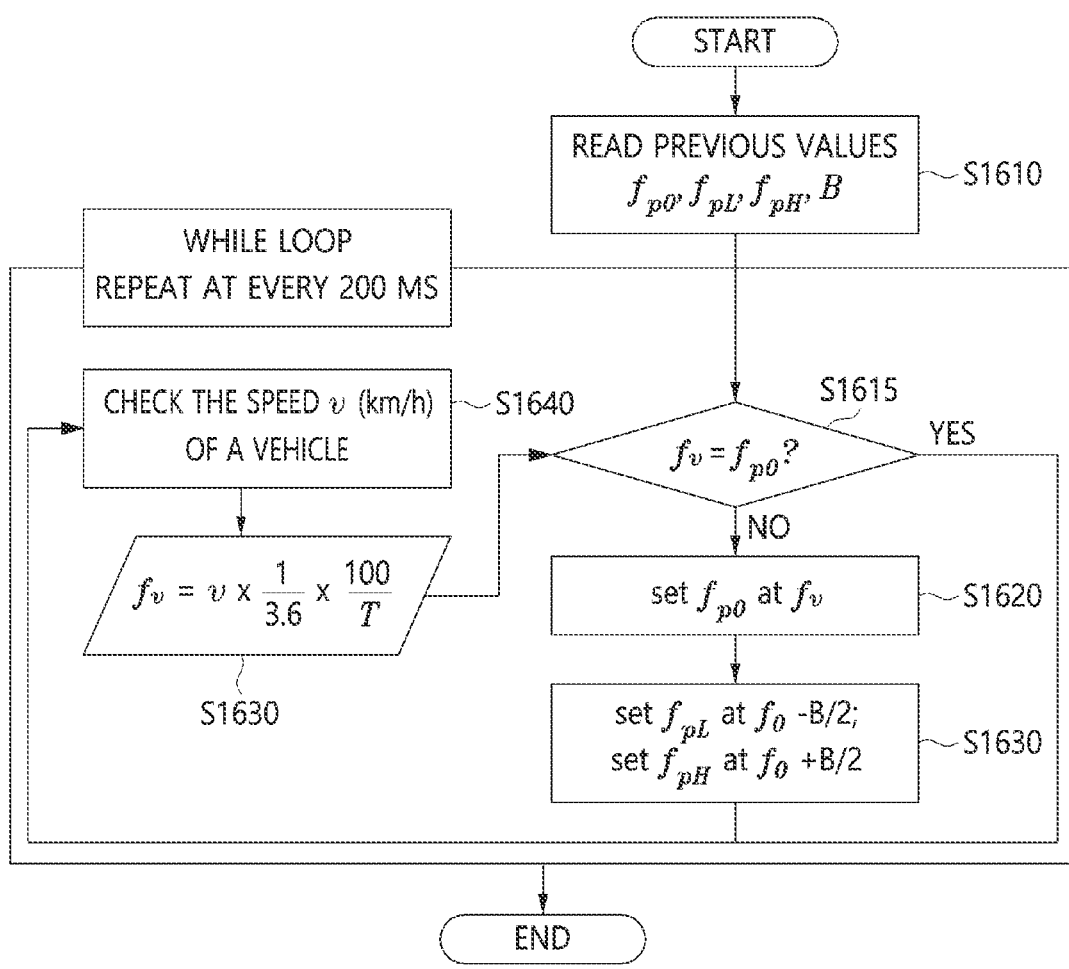
FIG. 16 is a flowchart illustrating in detail a process of setting a passband according to an embodiment of the present invention.

FIG. 16 is a flowchart illustrating in detail a process of setting a passband according to an embodiment of the present invention.

Referring to FIG. 16, in the process of setting a passband according to an embodiment of the present invention, first, the currently set values of a center frequency $fp_O$, a low cutoff frequency $fp_L$, a high cutoff frequency $fp_H$, and a frequency bandwidth B of a passband may be checked at step S1610.

Subsequently, steps from S1615 to S1650 may be repeatedly performed in order to reset the passband every 0.2 seconds (200 msec), which is the period at which the passband is reset.

In a loop including steps from S1615 to S1650, first, whether a target frequency $f_v$ set depending on the current speed of a vehicle is the same as the center frequency $fp_O$ is checked at step S1615, and when the target frequency $f_v$ is not the same as the center frequency $fp_O$, the value of the center frequency $fp_O$ may be set to match the value of the target frequency $f_v$ at step S1620.

Subsequently, the low cutoff frequency $fp_L$ and the high cutoff frequency $fp_H$ may be set so as to correspond to a signal, the amplitude of which is less than that of a signal of the center frequency $fp_O$ by a preset reference amplitude, at step S1630.

For example, in FIG. 16, the low cutoff frequency $fp_L$ and the high cutoff frequency $fp_H$ may be set so as to correspond to a signal, the amplitude of which is reduced to 50% of the signal amplitude at the center frequency $fp_O$, that is, a signal, the amplitude of which is 3 dB below the signal amplitude at the center frequency $fp_O$, at step S1630.

As described above, the low cutoff frequency $fp_L$ and the high cutoff frequency $fp_H$ are reset based on the center frequency $fp_O$, whereby the range from the reset low cutoff frequency $fp_L$ to the reset high cutoff frequency $fp_H$ may be set as the passband.

Here, the frequency bandwidth B of the passband may be changed so as to correspond to the reset low cutoff frequency $fp_L$ and the reset high cutoff frequency $fp_H$.

Subsequently, in the loop, after waiting for 0.2 seconds (200 msec), which is the period at which the passband is reset, the current speed v of the vehicle is checked at step S1640, the target frequency $f_v$ corresponding to the current speed of the vehicle is calculated at step S1650, and steps from step S1615 may be repeatedly performed.

Also, when it is determined at step S1615 that the target frequency $f_v$ is the same as the center frequency $fp_O$, it is determined that there is no need to reset the passband, and steps from step S1640 may be repeatedly performed after 0.2 seconds (200 msec), which is the period at which the passband is reset.

As described, the loop in FIG. 16 is repeatedly performed at every period at which the passband is reset, whereby the passband based on the speed of the vehicle may be set so as to perform effective noise filtering and clearly detect the target frequency.

Figure 17:
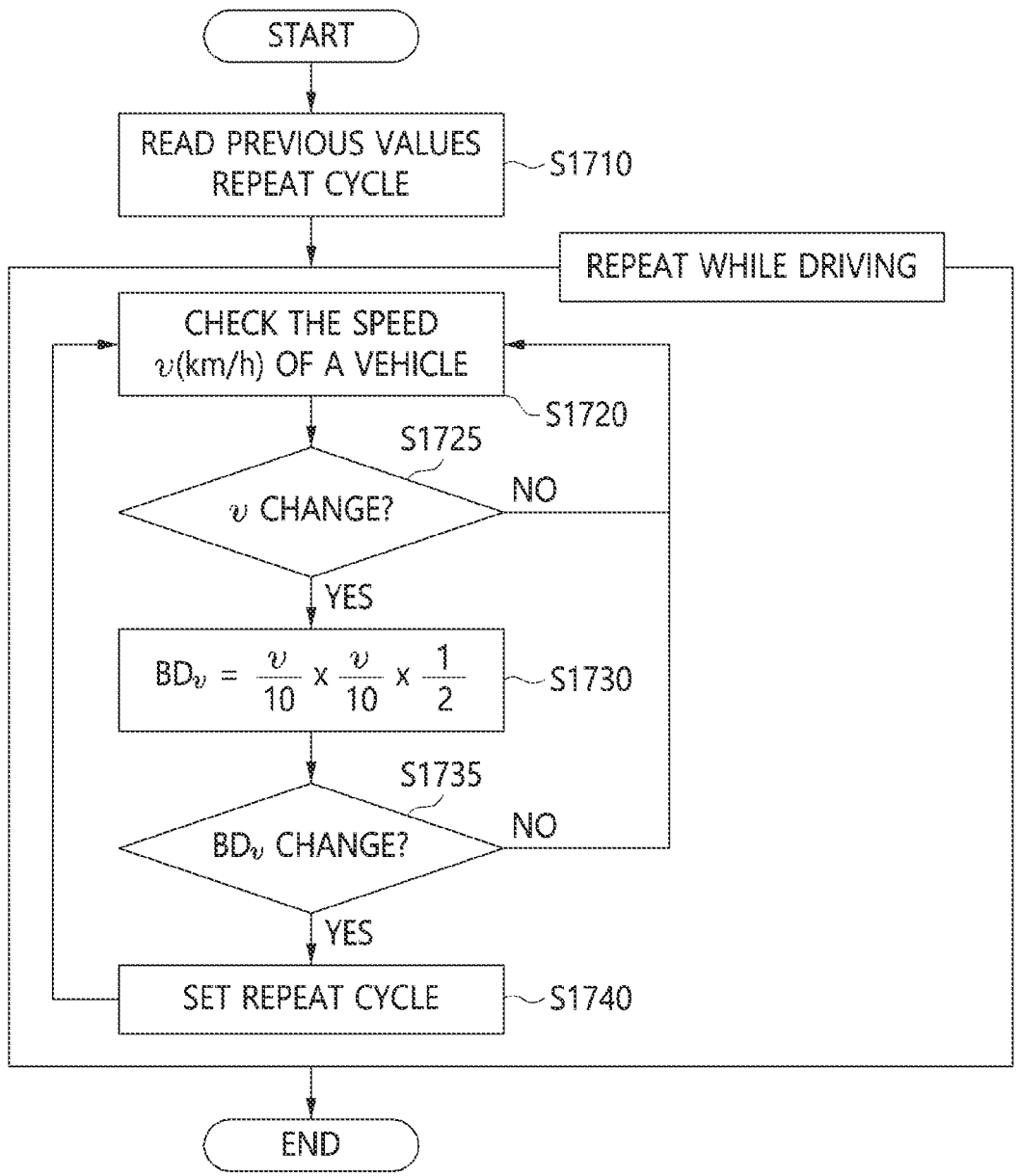
FIG. 17 is a flowchart illustrating in detail a process of setting a setting period at which a passband is reset according to an embodiment of the present invention.

FIG. 17 is a flowchart illustrating in detail the process for setting the period at which the passband is reset according to an embodiment of the present invention.

Referring to FIG. 17, in the process for setting the period at which the passband is reset according to an embodiment of the present invention, first, the currently set period (repeat cycle) at which the passband is reset may be checked at step S1710.

Subsequently, steps from S1720 to S1740 are repeatedly performed while a vehicle is driving, and the period at which the passband is reset is repeatedly calculated again. Here, when the calculated value is changed, the period may be reset to the changed value.

In the loop including steps from S1720 to S1740, first, the speed v of the vehicle is checked at step S1720, and whether the speed of the vehicle is changed may be checked at step S1725.

When it is determined at step S1725 that the speed of the vehicle is changed, an emergency braking distance $BD_v$ corresponding to the changed current speed may be calculated at step S1730, as shown in Equation (2):

$$\text{emergency braking distance} = \frac{\text{speed (km/h)}}{10} \times \frac{\text{speed (km/h)}}{10} \times \frac{1}{2} \quad (2)$$

Subsequently, whether the emergency braking distance is changed is determined at step S1730 by comparing the emergency braking distance calculated so as to correspond to the changed current speed with the emergency braking distance before the speed is changed, and when the emergency braking distance is determined to be changed, the period at which the passband is reset may be set again at step S1740.

For example, when a vehicle is driving at a speed of 30 km/h, the vehicle travels 8 meters per second. Here, according to Equation (2), the emergency braking distance is calculated to be 4.5 m, but it may be changed depending on the road surface and the environment around the vehicle.

Accordingly, for safe driving, it is necessary to reset the passband before the vehicle travels at least 3.5 m, and the period at which the passband is reset may be set to be 0.4 seconds or shorter than that.

However, in consideration of the actual braking distance, which is known to be two times longer than the emergency braking distance, the period at which the passband is reset is set to 0.2 seconds or less, whereby the risk of an accident at the time of emergency braking of the vehicle may be reduced.

When the period at which the passband is reset is set to 0.1 seconds, the passband is reset each time a vehicle travels 0.8 m, whereby the safety of an autonomous vehicle may be greatly improved.

Also, when it is determined at step S1725 that the vehicle speed is not greatly changed or when it is determined at step S1735 that there is no change in the emergency braking distance, steps from step S1720 may be repeatedly performed.

For example, at step S1725, the range within which the speed of the vehicle changes is preset, and the speed of the vehicle may be determined to have changed when the speed of the vehicle falls out of the range. Also, at step S1735, the range within which the emergency braking distance changes is preset, and the emergency braking distance may be determined to be changed when the emergency braking distance falls out of the range.

Figure 18:
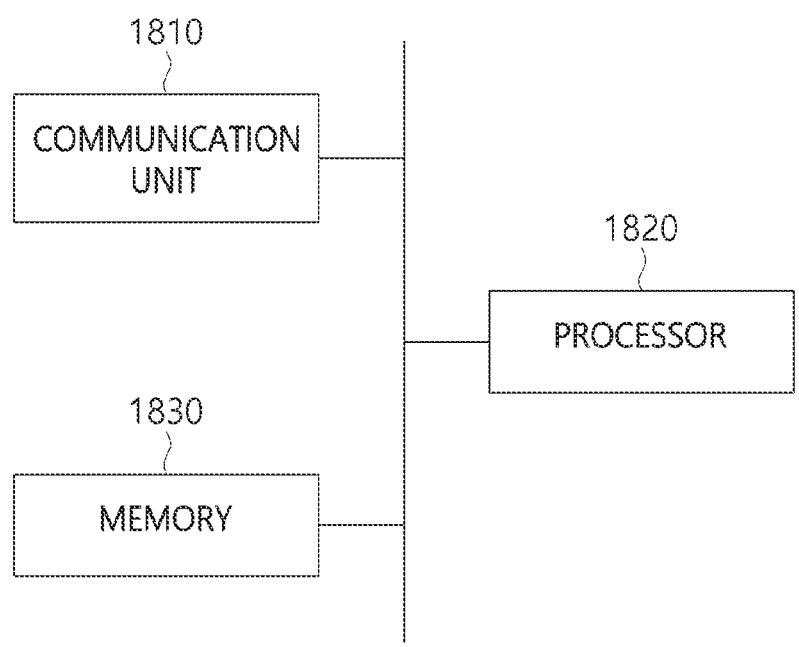
FIG. 18 is a block diagram illustrating an apparatus for generating a vehicle control signal based on magnetic paint lanes according to an embodiment of the present invention.

FIG. 18 is a block diagram illustrating an apparatus for generating a vehicle control signal based on magnetic paint lanes according to an embodiment of the present invention.

Here, the apparatus for generating a vehicle control signal based on magnetic paint lanes according to an embodiment of the present invention may operate in conjunction with a magnetic sensor provided in a vehicle, or may operate by including a magnetic sensor.

Referring to FIG. 18, the apparatus for generating a vehicle control signal based on magnetic paint lanes according to an embodiment of the present invention may include a communication unit 1810, a processor 1820, and memory 1830.

The communication unit 1810 may serve to transmit and receive information required for generating a vehicle control signal based on magnetic paint lanes through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and a seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1820 generates a magnetic sensing signal corresponding to an alternating magnetic pattern from magnetic paint lanes.

Here, the magnetic paint lanes may be generated so as to have a spatial period corresponding to a length greater than 0 cm and equal to or less than 25 cm by applying an alternating magnetic pattern.

Also, the processor 1820 performs noise filtering on the magnetic sensing signal, thereby generating a magnetic sensing signal from which noise is removed.

Here, noise filtering may comprise filtering out a low-frequency signal having a frequency lower than a target frequency, detected by taking into consideration the spatial period of the alternating magnetic pattern and a speed of the vehicle.

Here, noise filtering may comprise filtering out a first noise frequency component, corresponding to the state in which a vehicle is not being driven, and a second noise frequency component, corresponding to the state in which a change in the driving speed of the vehicle is less than a preset reference level.

Here, noise filtering may comprise changing the properties of filtering so as to correspond to the target frequency, which is detected based on the speed of the vehicle.

Here, the speed of the vehicle may be acquired based on information fed back from at least one of a speedometer in the vehicle, or a GPS sensor therein, or a combination thereof.

Here, noise filtering may comprise setting a passband, the center frequency of which is set to the target frequency, and filtering out a noise frequency component that is not included in the passband.

Here, the passband may correspond to a range from a low cutoff frequency to a high cutoff frequency, the low cutoff frequency and the high cutoff frequency being set so as to correspond to a signal, the amplitude of which is less than that of a signal of the center frequency by a preset reference amplitude.

Here, the passband may be reset at a setting period, which is set in consideration of the speed of the vehicle.

Here, the setting period may be calculated based on an emergency braking distance corresponding to the speed of the vehicle and on a travel distance corresponding to the speed of the vehicle during a preset time.

Here, noise filtering may comprise reducing the width of the passband when the difference in amplitude between the signal corresponding to the target frequency and the signal corresponding to the noise frequency component is less than a preset reference difference.

Also, the processor 1820 controls the operation of the vehicle based on the magnetic sensing signal from which noise is removed.

The memory 1830 stores a low-pass filter and an adaptive frequency filter.

Also, the memory 1830 stores various kinds of information generated in the above-described apparatus for generating a vehicle control signal based on magmatic paint lanes according to an embodiment of the present invention.

According to an embodiment, the memory 1830 may be separate from the apparatus for generating a vehicle control signal based on magnetic paint lanes, and may support the function for generating a vehicle control signal based on magnetic paint lanes. Here, the memory 1830 may operate as separate mass storage, and may include a control function for performing operations.

Meanwhile, the apparatus for generating a vehicle control signal based on magnetic paint lanes includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for generating a vehicle control signal based on magnetic paint lanes, a magnetic signal generated from magnetic paint lanes to which an alternating magnetic pattern is applied may be clearly detected, whereby a vehicle may be safely controlled.

Also, in an autonomous vehicle system for driving an autonomous vehicle using a magnetic signal generated from magnetic paint lanes, noise resulting from other vehicles, power transmission lines, vibration of the autonomous vehicle, and the like is removed, whereby malfunction of the autonomous vehicle may be reduced and safe operation thereof may be realized.

Also, a cutoff frequency value in a frequency filter is changed in real time adaptively to the speed of a vehicle, which frequently changes while driving, whereby a signal-to-noise ratio and the safety of an autonomous vehicle may be improved.

According to the present invention, a magnetic signal generated from magnetic paint lanes to which an alternating magnetic pattern is applied is clearly detected, whereby a vehicle may be safely controlled.

Also, the present invention may reduce, in an autonomous vehicle system for driving an autonomous vehicle using a magnetic signal generated from magnetic paint lanes, malfunction of the autonomous vehicle by removing noise resulting from other vehicles, power transmission lines, vibration of the autonomous vehicle, and the like, thereby realizing safe operation of the autonomous vehicle.

Also, the present invention may improve a signal-to-noise ratio and the safety of an autonomous vehicle by changing a cutoff frequency value in a frequency filter in real time adaptively to the frequently changing speed of the vehicle while driving.

The effects of the present embodiments are not limited to the above-mentioned effects, and other effects that have not been mentioned can be clearly understood by those skilled in the art from the appended claims.

As described above, the method for generating a vehicle control signal based on magnetic paint lanes and the apparatus for the same according to the present invention are not limitedly applied to the configurations and operations of the above-described embodiments, but all or some of the embodiments may be selectively combined and configured, so the embodiments may be modified in various ways.

What is claimed is:

1. A method for generating a vehicle control signal based on magnetic paint lanes, comprising:
   detecting a magnetic sensing signal generated from magnetic paint lanes to which an alternating magnetic pattern is applied based on a magnetic sensor attached to a vehicle;
   performing noise filtering on the magnetic sensing signal, thereby generating a magnetic sensing signal from which noise is removed; and
   controlling an operation of a vehicle based on the magnetic sensing signal from which noise is removed,
   wherein the magnetic paint lanes are generated so as to have a spatial period of a length greater than 0 cm and equal to or less than 25 cm by applying the alternating magnetic pattern,
   wherein the noise filtering comprises filtering out a low-frequency signal having a frequency lower than a target frequency, determined by taking into consideration the spatial period of the alternating magnetic pattern and a speed of the vehicle,
   wherein the noise filtering comprises changing properties of filtering so as to correspond to the target frequency detected based on the speed of the vehicle, and setting a passband, a center frequency of which is set to the target frequency, and filtering out a noise frequency component that is not included in the passband, and
   wherein a width of the passband is adjusted considering a difference in amplitude between a signal corresponding to the target frequency and a signal corresponding to the noise frequency component.

2. The method of claim 1, wherein the noise filtering comprises filtering out a first noise frequency component, corresponding to a state in which the vehicle is not being driven, and a second noise frequency component, corresponding to a state in which a change in a driving speed of the vehicle is less than a preset reference level.

3. The method of claim 1, wherein the speed of the vehicle is acquired based on information fed back from at least one of a speedometer in the vehicle, or a GPS sensor therein, or a combination thereof.

4. The method of claim 1, wherein the passband is reset at a setting period set in consideration of the speed of the vehicle.

5. The method of claim 4, wherein the setting period is calculated based on an emergency braking distance corresponding to the speed of the vehicle and on a travel distance corresponding to the speed of the vehicle for a preset time.

6. The method of claim 1, wherein the noise filtering comprises reducing a width of the passband when a difference in amplitude between a signal corresponding to the target frequency and a signal corresponding to the noise frequency component is less than a preset reference difference.

7. The method of claim 1, wherein the passband corresponds to a range from a low cutoff frequency to a high cutoff frequency, the low cutoff frequency and the high cutoff frequency being set so as to correspond to a signal, an amplitude of which is less than that of a signal of the center frequency by a preset reference amplitude.

8. An apparatus for generating a vehicle control signal based on magnetic paint lanes, comprising:
- a processor for detecting a magnetic sensing signal generated from magnetic paint lanes to which an alternating magnetic pattern is applied based on a magnetic sensor attached to a vehicle, performing noise filtering on the magnetic sensing signal so as to generate a magnetic sensing signal from which noise is removed, and controlling an operation of a vehicle based on the magnetic sensing signal from which noise is removed; and
- a memory for storing the magnetic sensing signal to perform noise filtering,
- wherein the magnetic paint lanes are generated so as to have a spatial period of a length greater than 0 cm and equal to or less than 25 cm by applying the alternating magnetic pattern,
- wherein the noise filtering comprises filtering out a low-frequency signal having a frequency lower than a target frequency determined by taking into consideration the spatial period of the alternating magnetic pattern and a speed of the vehicle,
- wherein the noise filtering comprises changing properties of filtering so as to correspond to the target frequency detected based on the speed of the vehicle, and setting a passband, a center frequency of which is set to the target frequency, and filtering out a noise frequency component that is not included in the pass-band, and
- wherein a width of the passband is adjusted considering a difference in amplitude between a signal corresponding to the target frequency and a signal corresponding to the noise frequency component.

9. The apparatus of claim 8, wherein the noise filtering comprises filtering out a first noise frequency component, corresponding to a state in which the vehicle is not being driven, and a second noise frequency component, corresponding to a state in which a change in a driving speed of the vehicle is less than a preset reference level.

10. The apparatus of claim 8, wherein the speed of the vehicle is acquired based on information fed back from at least one of a speedometer in the vehicle, or a GPS sensor therein, or a combination thereof.

11. The apparatus of claim 8, wherein the passband is reset at a setting period set in consideration of the speed of the vehicle.

12. The apparatus of claim 11, wherein the setting period is calculated based on an emergency braking distance corresponding to the speed of the vehicle and on a travel distance corresponding to the speed of the vehicle for a preset time.

* * * * *